United States Patent
Centa et al.

(10) Patent No.: US 8,771,623 B2
(45) Date of Patent: Jul. 8, 2014

(54) METHODS AND APPARATUS FOR RESIDUAL MATERIAL MANAGEMENT

(75) Inventors: Tim Centa, Pueblo West, CO (US); Greg Hawkins, Pueblo West, CO (US); Doug Hayes, Pueblo, CO (US)

(73) Assignee: Goodrich Corporation, Charlotte, NC (US)

( * ) Notice: Subject to any disclaimer, the term of this patent is extended or adjusted under 35 U.S.C. 154(b) by 890 days.

(21) Appl. No.: 12/610,012

(22) Filed: Oct. 30, 2009

(65) Prior Publication Data

US 2011/0104031 A1    May 5, 2011

(51) Int. Cl.
*D01F 9/12* (2006.01)
*B01L 3/00* (2006.01)

(52) U.S. Cl.
CPC .............................. B01L 3/502715 (2013.01)
USPC ........................ 423/210; 423/447.1; 423/460

(58) Field of Classification Search
USPC ............ 422/168, 187; 423/210, 447.1, 447.2, 423/460, 461; 264/29.1, 29.2, 29.6; 95/290; 55/DIG. 15, 315.1, 15.23
See application file for complete search history.

(56) References Cited

U.S. PATENT DOCUMENTS

| 4,479,927 | A | * | 10/1984 | Gelernt | .......................... 423/481 |
| 4,488,887 | A | * | 12/1984 | Angel et al. | ..................... 55/308 |
| 4,910,011 | A | | 3/1990 | Doerr | |
| 6,258,153 | B1 | * | 7/2001 | Hintermaier | ..................... 95/267 |
| 7,048,777 | B2 | * | 5/2006 | Sauer | .............................. 95/290 |
| 7,052,643 | B2 | | 5/2006 | Sion | |
| 7,351,390 | B2 | * | 4/2008 | Loncle et al. | .............. 423/447.7 |
| 7,410,630 | B2 | | 8/2008 | Loncle et al. | |
| 7,862,638 | B2 | * | 1/2011 | Moriya et al. | ............... 55/385.1 |
| 2004/0009113 | A1 | | 1/2004 | Sion | |
| 2004/0009116 | A1 | | 1/2004 | Loncle et al. | |

FOREIGN PATENT DOCUMENTS

| CN | 101496988 | 8/2009 |
| DE | 10320559 | 5/2003 |
| EP | 0481281 | 4/1992 |
| FR | 2842191 | 1/2004 |
| FR | 2842192 | 1/2004 |
| FR | 2842193 | 1/2004 |
| JP | 53091075 | 8/1978 |
| JP | 59109224 | 6/1984 |
| JP | 60183004 | 9/1985 |

(Continued)

OTHER PUBLICATIONS

GB; Search Report dated Oct. 28, 2010 in Application No. GB0922051.8.

(Continued)

*Primary Examiner* — Jill Warden
*Assistant Examiner* — Joye L Woodard
(74) *Attorney, Agent, or Firm* — Snell & Wilmer L.L.P.

(57) ABSTRACT

Residual impurity reduction methods and apparatus are provided. A method comprises conducting a gaseous stream through an unlined portion of a pipe, wherein the gaseous stream comprises sodium and wherein the unlined portion of the pipe is at least about eighteen inches long, injecting a neutralizing agent into the gaseous stream at an injection point, wherein the injection point is located at a point where the sodium is in at least a partially condensed state. The gaseous stream is conducted through a heated portion of a pipe and a cooled portion of a pipe. In addition, methods and apparatus may include a trap system for use with a carbonization furnace.

9 Claims, 3 Drawing Sheets

(56) References Cited

FOREIGN PATENT DOCUMENTS

| | | |
|---|---|---|
| JP | 2000317260 | 5/1999 |
| KR | 20030052589 | 12/2001 |
| WO | 2004007402 | 1/2004 |

OTHER PUBLICATIONS

Search Report dated Jul. 3, 2012 in French Application No. 0959628.
GB search report dated May 27, 2010 in GB application No. GB0922051.8.

* cited by examiner

METHODS AND APPARATUS FOR RESIDUAL MATERIAL MANAGEMENT

FIELD OF INVENTION

The present invention generally relates to residual material management, and more particularly, to methods and apparatus for managing residual materials (e.g., sodium and/or hydrocarbons) during the processing of carbon fiber bodies and carbon fiber body precursor materials.

BACKGROUND OF THE INVENTION

Industrial applications of ceramics have become increasingly important over the last fifty years. Monolithic ceramics and cermets, however, exhibit low impact resistance and low fracture toughness. Ceramic Matrix Composites (CMCs) exhibit some useful thermal and mechanical properties and hold the promise of being very good materials for use in high temperature environments and/or in heat sink applications. CMCs generally comprise one or more ceramic materials disposed on or within another material, such as, for example, a ceramic material disposed within a structure comprised of a fibrous material. Fibrous materials, such as carbon fiber, may be formed into fibrous bodies suitable for this purpose.

Carbon fiber bodies are typically formed from carbon fiber body precursors. For example, preoxidized polyacrylonitrile (PAN) is commonly used as a carbon fiber body precursor. Carbon fiber body precursors may be manipulated and fabricated in a manner similar to a textile (e.g., weaving, knitting, etc) to form desired structures. To transform the carbon fiber body precursor into a carbon fiber body, various methods and techniques may be used. For example, during transformation of PAN materials, the PAN fiber may be carbonized and then processed to eliminate impurities (often metallic) that may be found in the PAN fiber. Sodium is a common metal found in PAN fibers that may be removed during processing into a carbon fiber body. Other carbon fiber body precursors may contain impurities comprising magnesium, calcium, iron, nickel, or chromium, in addition to sodium.

Transformation of carbon fiber body precursors, such as PAN fibers, often occurs in a two stage process. The first stage may be a carbonization stage. A carbonization stage is typically performed at temperatures of less than 1100° C., and most typically between about 800° C. and 950° C. The second stage may be a high temperature stage, typically using temperatures over 1400° C.

However, while the second stage causes the PAN fibers to release residual impurities (also referred to herein as residual materials) in a gaseous state, the subsequent management of the residual impurities is often problematic. For example, sodium is a highly reactive metal. As a gaseous stream exits the process vessel, sodium contained therein may react with other materials in the gaseous stream and/or the pipes and other devices that contain the gaseous stream. Such reactions weaken the integrity of the components that come into contact with the gaseous stream, thus reducing useful product life and presenting a risk of dangerous malfunction. Further, as sodium leaves the gaseous state, it may cause damage to other processing hardware, which may be costly to replace.

Although conventional methods of managing sodium include injecting water or carbon dioxide into the gaseous stream immediately after the gaseous stream exits a furnace at a point where all sodium contained in the gaseous stream is in a gaseous state, routine cleaning and incomplete neutralization issues persist. Accordingly, there is a need for improved management of residual materials, such as sodium, in such an industrial process. In this regard, it is desirable to construct a system having improved management and removal of residual impurities wherein a gaseous stream containing sodium is directed through a heated zone and a cooled zone to better facilitate the removal of residual impurities. Additionally, it is desirable to perform one or more neutralization steps to better manage residual impurities.

SUMMARY OF THE INVENTION

In various embodiments, residual impurity reduction methods and systems are provided that manage residual impurities (e.g., sodium and other metals) in a carbon fiber production process. In this regard, it has been found that directing a gaseous stream through a heated zone and cooled zone, coupled with neutralization step performed at a specifically selected location, may reduce the damage associated with residual impurities such as sodium. Moreover, methods and systems in accordance with various embodiments may neutralize sodium and improve transport of residual impurities to desired areas, thereby reducing the detrimental effects resulting from residual sodium or impurities, such as the weakening of structural components that come in contact with such materials.

For example, a residual impurity reduction method comprises conducting a gaseous stream through an unlined portion of a pipe at least about eighteen inches long, wherein the gaseous stream comprises sodium and injecting a neutralizing agent into the gaseous stream at an injection point, wherein the injection point is located at a point where the sodium is in at least a partially condensed state, conducting the gaseous stream through a heated portion of a pipe to a cooled portion of a pipe and conducting the gaseous stream through the cooled portion of a pipe.

Various embodiments include a trap system for use with a carbonization furnace comprising an unlined pipe having a length of about at least eighteen inches, a heated pipe connected to the unlined pipe, a cooled pipe connected to the heated pipe, wherein the heated pipe comprises an inner chamber and an outer chamber, wherein the cooled pipe comprises an inner chamber and an outer chamber. Such embodiments may further comprise a neutralizing agent injection point located in at least one of the unlined pipe and the heated pipe.

DETAILED DESCRIPTION

Figure 1:
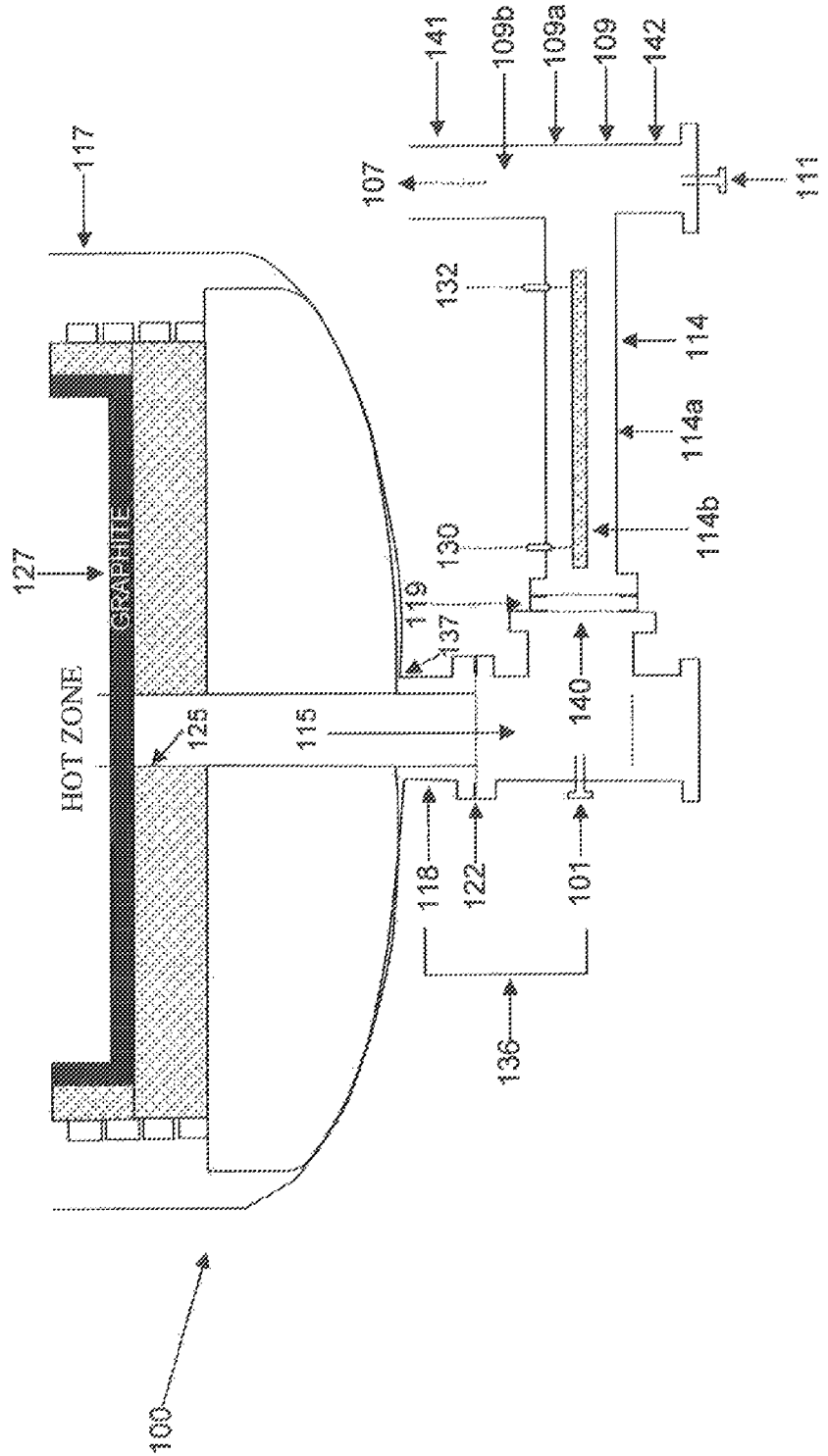
FIG. 1 is a schematic of a residual management system of an exemplary embodiment.

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As noted above, in various embodiments, residual impurity reduction methods and systems provide improved management of residual impurities (e.g., sodium and other metals) in a carbon fiber production process. In particular, trap systems and methods of using the same are disclosed herein that improve residual impurity management. In this regard, in an embodiment and with reference to FIG. 1, a gaseous stream containing an impurity is advantageously directed through an unlined portion of pipe 136, which is at least about 18 inches long. A neutralizing agent may be injected into the gaseous stream at an injection point 101, preferably where the sodium (or other impurity) is in an at least partially condensed state. The neutralizing agent reacts with the sodium to form a resultant product, such as sodium bicarbonate, which is less detrimental to piping materials than sodium, may lessen maintenance intervals, and may enhance the ease of maintenance.

In an embodiment, the gaseous stream may be conducted through heated pipe 114 to cooled pipe 109. Heated pipe 114 may be advantageously kept a temperature such that at least a portion of the residual impurities are maintained in a gaseous state. The gaseous stream may also be conducted through cooled pipe 109. Cooled pipe 109 may be advantageously kept at a temperature such that at least a portion of the residual impurities condense from the gaseous state.

For the purposes of understanding methods and systems, as used herein, a carbon fiber body may comprise any material containing carbon fiber. Carbon fiber bodies are typically formed from carbon fiber body precursors in a carbon fiber transformation process. In this regard, a carbon fiber body precursor may comprise any material containing a carbon fiber precursor. Carbon fiber precursors include PAN fibers, rayon fibers, and pitch fibers. The term PAN fiber and PAN material are used interchangeably herein. As noted above, for example, PAN is commonly used as a carbon fiber body precursor.

As noted above, to transform the carbon fiber body precursor into a carbon fiber body, various methods and techniques may be used. For example, during transformation of PAN materials, the PAN material may be carbonized and then processed to eliminate impurities (often comprising metals and metallic compounds) that may be found in the PAN material. For example, sodium is a common metal found in PAN fibers that may be removed during processing into a carbon fiber body using methods and systems disclosed herein. Other carbon fiber body precursors may contain impurities comprising magnesium, calcium, iron, nickel, or chromium, in addition to sodium.

Transformation of carbon fiber body precursors, such as PAN fibers, often occurs in a two stage process in a process vessel, such as a furnace. For example, with continuing reference to FIG. 1, a carbon fiber transformation process may occur in furnace 117. The first stage of the carbon fiber transformation process may be referred to as a carbonization stage. A carbonization stage is typically performed at temperatures of less than 1100° C., and most typically between about 800° C. and 950° C. The second stage may be a high temperature stage, typically using temperatures over 1400° C., up to about 2200° C. and may be performed in a vacuum or partial vacuum. The second stage is referred to herein as a second stage or a second stage of a carbon fiber transformation process.

During the second stage, sodium and other impurities enter a gas form and exit the body of furnace 117 in a gaseous stream, usually by way of a pipe. Sodium is a highly reactive metal, and neutralization may be used to prevent fouling or corrosion of various downstream components. In this regard, in an embodiment, neutralization may be accomplished by carefully directing the injection of a neutralizing agent at a specifically selected injection point downstream from furnace 117. Exemplary neutralizing agents include carbon dioxide ($CO_2$), water, steam, atomized water, and nitrous oxides (e.g. $NO_2$). The introduction of one or more neutralizing agents may be accomplished by injection into a pipe containing the gaseous stream leaving the furnace. A gaseous stream that has been injected or otherwise mixed with a neutralizing agent may be referred to as a post-neutralized gaseous stream.

It has been found that allowing sodium to at least partially leave the gaseous state (i.e., to allow sodium to at least partially condense) prior to introduction of a neutralizing agent enhances neutralization and improves the ability to manipulate sodium into downstream areas where further neutralization and/or removal efforts may be more easily performed.

Thus, by selecting the injection point of the neutralization agent to be at a location where at least some of the sodium has condensed (i.e., so that at least a portion of the sodium is not in gaseous form), the management of residual sodium may be improved. In this respect, in an embodiment and with reference to FIG. 1 injection point 101 is at least about eighteen inches from furnace 117. In addition, it has been found that conducting a post-neutralized gaseous stream into a heated zone (e.g., a heated pipe), may allow for reduced deposition of residual impurities in the heated zone. The reduced deposition may occur because a smaller amount of residual impurities condense in the heated zone than would condense in a non-heated zone. Exemplary residual impurities in a post-neutralized gaseous stream include sodium, other metals, sodium in a neutralized form (e.g., sodium bicarbonate), and/or hydrocarbons.

Still further, it has been found that conducting a post-neutralized gaseous stream into a cooled zone (e.g., a cooled pipe), may allow for improved separation and isolation of residual impurities because a significant amount of residual impurities are brought into a non-gaseous state in an area designed to be easily cleaned and maintained. Although a post-neutralized gaseous stream may be conducted into a cooled zone immediately after neutralization, in various embodiments, a post-neutralized gaseous stream may be conducted into a cooled zone after leaving a heated zone. Moreover, in various embodiments, a second neutralization stage may be conducted within a cooled zone for improved neutralization and residual impurity management. For example, second neutralization point 111 may be used to further neutralize residual impurities. The use of a cooled zone provides a method of managing residual impurities thermally, which may be less expensive and/or more effective than conventional means.

With continuing reference to FIG. 1, in an embodiment, and as described in further detail below, apparatus and methods for managing and removing impurities may comprise furnace 117, graphite 127, pipe 118, gaseous stream 115, pipe portion 125, unlined pipe portion 136, point 137, joint 122, first injection point 101, post-neutralized gaseous stream 140, joint 119, heated pipe 114, input access point 130, output access point 132, cooled pipe 109, input access point 141, output access point 142, second neutralization injection point 111, and second neutralized gaseous stream 107.

In an embodiment, a system further comprises trap system 100 which is shown connected to furnace 117. Trap system 100 may be any system comprising a heated zone and a cooled zone. Trap system 100 may also comprise an unlined pipe portion and an injection point 101, specifically located to advantageously provide neutralization a point where at least a portion of the sodium in gaseous stream 115 is in a condensed state. For example, in various embodiments, injection point 137 is located at least about eighteen inches from a point where trap system connects to furnace 117, for example, at point 137.

In various embodiments, at least a portion of unlined pipe portion 136, heated pipe 114, cooled pipe 109, and pipe portion 125 comprises refractory lined piping. Refractory lined piping may be made from oxides of calcium, silicon, magnesium, aluminum or a combination of the same. Zirconia may be utilized, for example, because of its ability to withstand high temperatures. Silicon carbide or carbon may also be utilized. The refractory lining may be installed as firebrick, it may be casted or sintered, or it may be monolithic. For example, heated pipe 114 and cooled pipe 109 may be completely or partially refractory lined.

As used herein, an unlined pipe may be partially or completely unlined, though it may be partially or completely lined or insulated as well, such that, after traveling a distance of at least about 18 inches, the gaseous stream is at a temperature where the sodium contained therein has at least partially exited the gaseous state. For example, in various embodiments, after the gaseous stream has traveled at least about 18 inches in the pipe, the gaseous stream may be at a temperature of about 900° F. to about 2200° F. In various embodiments the gaseous stream may be at a temperature of about 900° F. to about 1500° F., thus allowing at least some of the gaseous sodium to condense.

Upon exit of the furnace, for example, sodium contained in a gaseous stream may be in a completely gaseous form. The gaseous stream may exit a furnace when the gaseous stream leaves an exterior portion of the furnace. For example, if contained in a pipe, the gaseous stream exits the furnace at the point where the pipe joins the exterior of the furnace. For example, point 137 is a point where gaseous stream 115 exits furnace 117.

In various embodiments, after exit from the furnace, the gaseous stream may be allowed to cool so that sodium contained therein at least partially exits the gaseous state (i.e., the sodium at least partially condenses). As noted above, in various embodiments, the gaseous stream exits a furnace via a pipe and is then cooled. Any manner of cooling may be used to accomplish such an objective. For example, as the gaseous stream may have a low specific heat capacity, it may not be necessary to artificially cool the pipe containing the gaseous stream. Thus, in various embodiments, the gaseous stream exits the furnace in an at least partially unlined pipe. An unlined pipe may comprise a pipe that will allow sodium in the gaseous stream to at least partially leave the gaseous state (i.e., at least partially condense) after the gaseous stream travels at least eighteen (18) inches from the exit point of the furnace. For example, unlined pipe portion 136 may be at least eighteen (18) inches from injection point 137.

In various embodiments, the neutralizing step is performed on a gaseous stream after the gaseous stream exits a furnace in a second step of a carbon fiber treating process. Any number of carbon fiber treating processes may benefit from the teachings contained herein, such as carbon fiber treating processes that emit sodium (e.g., sodium metal) into a gaseous stream. Such a process may be, for example, a second stage of a carbon fiber transformation process, as described above. In a second stage of a carbon fiber transformation process, gaseous stream 115 may exit furnace 117 at about 1400° C. to and about 2200° C. Gaseous stream 115 may comprise various residual impurities, such as sodium, hydrocarbons, magnesium, chromium, iron, and other metals.

As noted above, in various embodiments, one or more neutralization stages may occur. For example, a first neutralization may be performed by injecting or otherwise introducing a neutralizing agent into a pipe containing a gaseous stream comprising sodium and/or other residual impurities.

In various embodiments, the neutralization may comprise a first neutralization performed on a gaseous stream. For example, after the gaseous stream 115 exits the furnace via pipe portion 125, an injection point is located such that, at the time of injection, the sodium contained in the gaseous stream has at least partially exited the gaseous state. For example, in various embodiments, a neutralizing agent is injected into gaseous stream 115 in unlined pipe portion 136 at first injection point 101, wherein first injection point 101 is at least about 18 inches from point 137.

In various embodiments, a second neutralization may be performed by injecting or otherwise introducing a neutralizing agent into a pipe containing a gaseous stream comprising sodium and/or other residual impurities at a point after a first neutralization is performed. For example, after post-neutralized gaseous stream 140 exits heated pipe 114, and enters cooled pipe 109, a neutralizing agent may be injected at second injection point 111. After injection at second injection point 111, post-neutralized gaseous stream 140 becomes second neutralized gaseous stream 107.

Injection of a neutralizing agent may be accomplished using any known or as yet unknown means. For example, any suitable type of pump, atomizer, or pressure system may be used. In various embodiments, injection may be performed using a retractable or non-retractable injection quill, a diffuser, or injection lance. Suitable injection methods include a sparge nozzle, an atomizing nozzle, and a misting nozzle. Injection equipment for these purposes may be obtained from various suppliers, including Saf-T-Flo, 4071-L East La Palma Ave., Anaheim, Calif. USA 92807 (quill models EB-110, EB-111, EB-112), BETE Fog Nozzle, Inc., 50 Greenfield Street Greenfield, Mass. 01301 USA (models FF, NF, SPN), Steinen, 29 East Halsey Rd., Parsippany, N.J. USA 07054 (models A, AF, AM, P), and Cole-Parmer, 625 East Bunker Court, Vernon Hills, Ill. USA 60061, among others.

In various embodiments, the products of neutralization are dependent upon the neutralizing agent. For example, sodium is a highly reactive metal, so there are many potential neutralizing agents. Neutralizing agents include carbon dioxide ($CO_2$), water, steam, atomized water, and nitrous oxides (e.g., $NO_2$). Sodium may react with a neutralizing agent to form, for example, sodium bicarbonate, sodium hydroxide, and other sodium compounds. In various embodiments, several neutralizing agents may be used in combination. Any combination of the named and other unnamed neutralizing agents is contemplated herein.

In various embodiments, a post-neutralized gaseous stream is conducted through a heated zone. A heated zone may control the temperature of the post-neutralized gaseous stream so that at least a portion of the residual impurities contained therein may remain in a gaseous state. For example, the gaseous stream may be controlled at a temperature of about 900° F. to about 1500° F. in the heated zone, and/or at a temperature of about 1100° F. to about 1250° F. in the heated zone. The use of a heated zone may be used to further control the post-neutralized gaseous stream by, for example, maintaining the constituents of the gaseous stream in a gas form, a liquid form, or some equilibrium thereof. This control of temperature of the heated zone may be used to prevent residual impurities from damaging, fouling, or otherwise affecting the piping in the heated zone and may further aid in the conduction of a gaseous stream to a cooled zone. As such, there reductions in damage to the piping in the heated zone may result in longer useful product life and less frequent maintenance.

In various embodiments, the heated zone may comprise a heated portion of a pipe. For example, a heated zone comprises heated pipe 114. A heated portion of a pipe may be a pipe that has been or is continuously or periodically heated. A heated portion of a pipe may be referred to as a heated pipe, although it understood that a heated pipe may be configured so that only a portion of the pipe is heated. For example, in various embodiments, one or more electrical resistance heating devices (i.e., resistance heating elements) may be wrapped around or incorporated into a pipe to supply heat by electrical resistance. In such embodiments, the electrical resistance heating devices may be packaged in insulating material that wraps around a pipe. Alternatively, an induction heating system may be used to heat a pipe. A pipe used in the heating zone may also be refractory lined.

In further embodiments, the heated pipe may be heated by circulation of a heating fluid around the heated pipe. For example, with reference to FIG. 1, heated pipe 114 is heated by a heating fluid. A heating fluid may be any fluid that has a suitable specific heat capacity. For example, heating fluid may be oil, a liquid aqueous solution, or a gas. Heating fluid may comprise mineral oil. Heating fluid may also comprise, silicone oil, synthetic or semi-synthetic hydrocarbon, petroleum hydrocarbon, paraffin oil, polyalkaline glycol, water-glycol (such as would commonly be found in automobile antifreeze), steam, $N_2$ gas and air.

The heating fluid may be conducted around a pipe in any suitable manner, for example, by bathing the exterior of the pipe in the heating fluid. In various embodiments, the heated pipe may be configured as two concentric pipes having an inner chamber and an outer chamber. The walls of the inner chamber and/or the outer chamber may be refractory lined. The outer chamber may have input access point 130 and output access point 132. Heating fluid may be conducted into input access point 130 so that the heating fluid flows to output access point 132 and exits the heated pipe. In such embodiments, heating fluid that has exited output access point 132 may be conducted to a heating device for reheating and then circulated to input access point 130. In this manner, circulating heating fluid in the outer chamber will transfer heat to the inner chamber. Temperature control of the inner chamber may be accomplished via control of the heating fluid temperature. For example, with reference to FIG. 1, heating fluid may be pumped into input access point 130. The heating fluid may then heat heated pipe 114 and exit heated pipe 114 through output access point 132.

In various embodiments, a post-neutralized gaseous stream is conducted through a cooled zone to further control the post-neutralized gaseous stream.

For example, the cooled zone may be used to purge at least a portion, and potentially all, of the residual impurities from the gaseous stream. A cooled zone may cool the temperature of the post-neutralized gaseous stream to a temperature of about 300° F. to about 700° F. in the cooled zone, and/or at a temperature of about 400° F. to about 550° F. in the cooled zone. Accordingly, in this manner, residual impurities are managed via thermal intervention in the cooled zone.

For example, the cooled zone may be used to control constituents of the gaseous stream to substantially or completely exit the gaseous form and/or to for the constituents to take a liquid or solid form. This control of temperature of the cooled zone may be used to prevent residual impurities from damaging, fouling, or otherwise affecting piping that is downstream of the cooled zone. Reduction in pipe damage increase useful product life. Further, such a thermal elimination mechanism is a simple, elegant, non-mechanical solution for trapping and managing residual impurities.

In various embodiments, a cooled zone comprises a cooled portion of one or more pipes. In further embodiments, for example, a cooled pipe may be cooled by circulation of a cooling fluid around the cooled pipe. A cooling fluid may be any fluid that has a suitable specific heat capacity. For example, a cooling fluid may be oil, a liquid aqueous solution, nitrogen gas, steam, or another gas. Cooling fluid may comprise mineral oil. Cooling fluid may also comprise, silicone oil, synthetic or semi-synthetic hydrocarbon, petroleum hydrocarbon, paraffin oil, polyalkaline glycol, water-glycol (such as would commonly be found in automobile antifreeze), steam, $N_2$ gas and air.

The cooling fluid may be conducted around a pipe in any suitable manner, for example, by bathing the exterior of the pipe in the cooling fluid. In various embodiments, a cooled pipe may be configured as two concentric pipes having an inner chamber and an outer chamber. The outer chamber may have an input access point and an output access point. Cooling fluid may be conducted into input access point 141 so that the cooling fluid flows to output access point 142 and exits cooled pipe 109. In such embodiments, cooling fluid that has exited the output access point may be conducted to a cooling device for cooling and then circulated to the input access point. In this manner, circulating cooling fluid in the outer chamber will transfer heat to the inner chamber. Temperature control of the inner chamber may be accomplished via control of the cooling fluid temperature. For example, cooling fluid may be pumped into input access point 141 and allowed to cool cooled pipe 109. Cooling fluid may flow to output access point 141 and exit cooled pipe 109.

In various embodiments, the cooled zone itself may be referred to as a cold trap. As described in more detail above, a second neutralization may occur in or near the cooled zone to further manage residual impurities. In various embodiments, a cooled zone may be connected to a heated zone such that a gaseous stream is conducted through the heated zone prior to entrance into the cooled zone. Pipes comprising the cooled zone may be made of refractory piping.

In various embodiments, the second neutralization may be performed while a post-neutralized gaseous stream is either in a cooled zone, or immediately before a post-neutralized gaseous stream enters a cooled zone or immediately after a post-neutralized gaseous stream exits a cooled zone. For example, the injection point may be selected so that, at the time of injection, the gaseous stream is within a cooled zone. For example, in various embodiments, a neutralizing agent is injected into a cooled pipe containing a gaseous stream. Any of one of the neutralizing agents described herein, or a combination of the same, are suitable for use in a second neutralization. In this regard, in an embodiment and with reference to FIG. 1, second neutralization injection point 111 may be located so that a second neutralization is performed within cooled pipe 109.

With continued reference to FIG. 1, trap system 100 is shown connected to furnace 117. Furnace 117 may be used in a carbon fiber transformation process, as described above. Accordingly, a carbonization first stage may occur in furnace 117 and a second, higher temperature stage may occur subsequent to the carbonization of the first stage. The second stage heating may occur at between about 1400° C. to and about 2200° C. Furnace 117 may be lined with various materials. For example, graphite 127 lines the inner portion of furnace 117. Furnace 117 contains pipe 118 for the release of gaseous stream 115. Gaseous stream 115 may contain residual impurities, such as gaseous sodium, released by carbon fiber precursors in furnace 117. Sodium in gaseous stream 115 while gaseous stream 115 is in pipe portion 125 is completely in gaseous form. Pipe 118 contains pipe portion 125. Pipe portion 125 conducts gaseous stream 115 so that gaseous stream 115 exits furnace 117 at point 137. Pipe portion 125 ceases at point 137.

Unlined pipe portion 136 is the portion of pipe 118 from point 137 to first neutralization injection point 101. Gaseous stream 115, while in unlined pipe portion 136, cools so that sodium within gaseous stream 115 at least partially exits a gaseous state. Unlined pipe portion 136 is at least about eighteen inches in length and, in various embodiments, unlined pipe portion 136 may range from about 18 inches to about 48 inches in length. Unlined pipe portion 136 may comprise one or more joints, such as joint 122. Accordingly, unlined pipe portion 136 may comprise portions of two separate pipes that are connected at one or more joints.

Figure 1B:
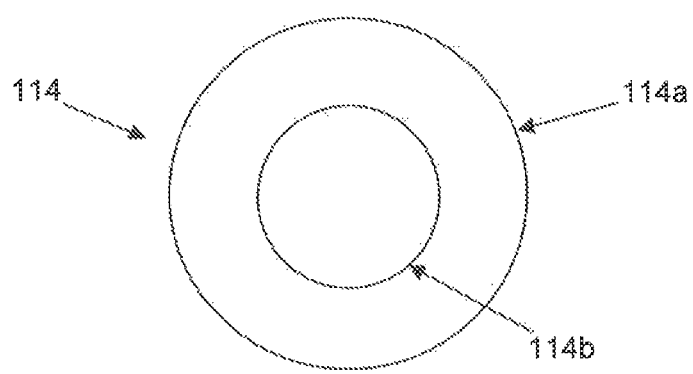
FIG. 1B illustrates a cross section of a heated pipe of an exemplary embodiment.

A neutralizing agent is injected at first injection point 101, where sodium within gaseous stream 115 has at least partially exited a gaseous state (i.e., the sodium has at least partially condensed). Post-neutralized gaseous stream 140 may flow through joint 119 as post-neutralized gaseous stream 140 is conducted into heated pipe 114. With reference to FIGS. 1 and 1B, heated pipe 114 may comprise an inner chamber 114b and an outer chamber 114a such that input access point 130 and output access point 132 provide access to the outer chamber 114a. In such embodiments, post-neutralized gaseous stream 140 is conducted into the inner chamber 114b of heated pipe 114. A heating fluid may be circulated from input access point 130 to output access point 132 to heat the inner chamber 114b of heated pipe 114. As described herein, heated pipe 114 may be controlled at a temperature of about 900° F. to about 1500° F., and/or at a temperature of about 1100° F. to about 1250° F. Heated pipe 114 may be of any suitable length so that heated pipe 114 may connect with cooled pipe 109.

Figure 1C:
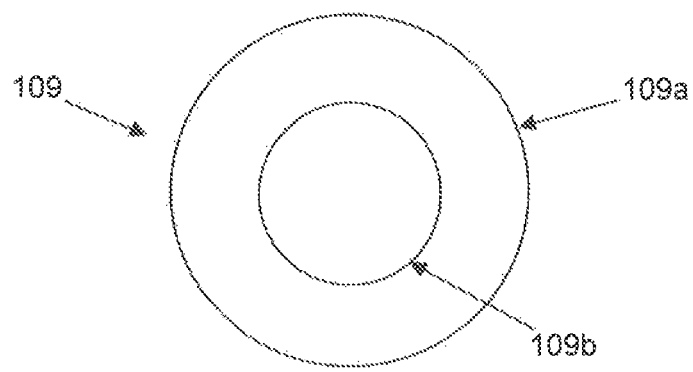
FIG. 1C illustrates a cross section of a cooled pipe of an exemplary embodiment.

With reference to FIGS. 1 and 1C, cooled pipe 109 may comprise an inner chamber 109b and an outer chamber 109a such that input access point 141 and output access point 142 provide access to the outer chamber 109a. In such embodiments, post-neutralized gaseous stream 140 is conducted into the inner chamber 109b of cooled pipe 109. A cooling fluid may be circulated from input access point 141 to output access point 142 to cool the inner chamber 109b of cooled pipe 109. As described herein, cooled pipe 109 may be controlled at a temperature of about 300° F. to about 700° F., and/or at a temperature of about 400° F. to about 550° F. Cooled pipe 109 may be of any suitable length.

Second neutralization injection point 111 is positioned within cooled pipe 109. Any neutralizing agent may be injected via second neutralization injection point 111 to form second neutralized gaseous stream 107. Second neutralized gaseous stream 107 may be free or substantially free of residual impurities.

Figure 2:
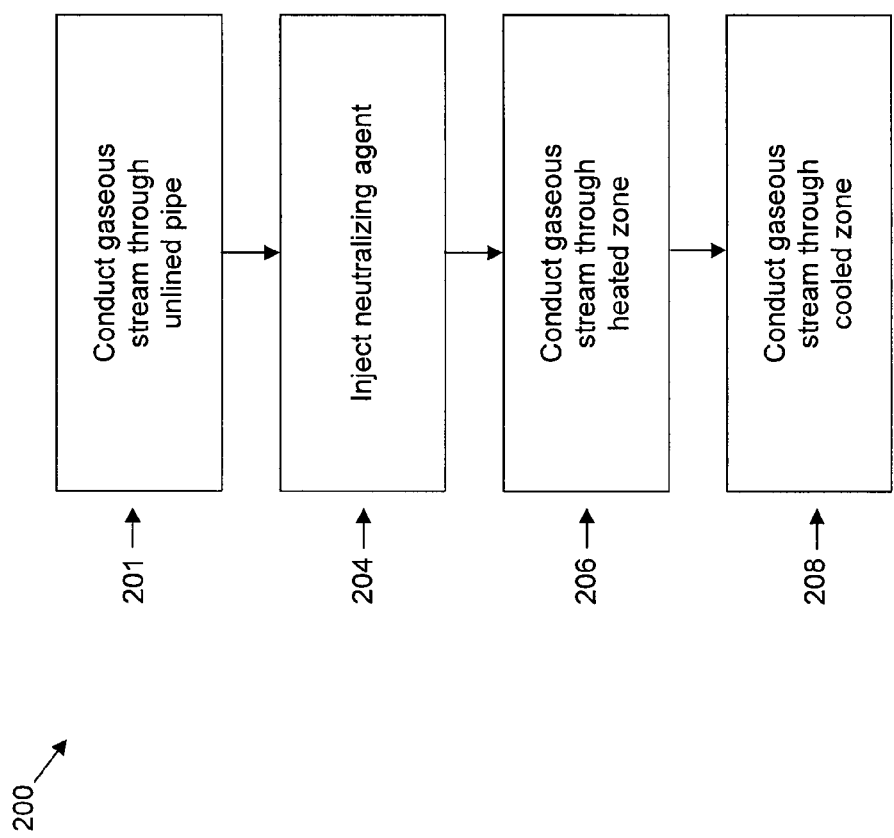
FIG. 2 is a flow chart illustrating an exemplary embodiment of a method for residual impurity management.

With reference now to FIG. 2, residual impurity reduction method 200 is illustrated. Conduct step 201 comprises conducting a gaseous stream through an unlined portion of a pipe, wherein the gaseous stream comprises sodium, wherein the unlined portion of the pipe is at least eighteen inches long. Injection step 204 comprises injecting a neutralizing agent into the gaseous stream at an injection point, wherein the injection point is located at a point where the sodium is in at least a partially condensed state (i.e., the sodium has at least partially condensed). Heat conducting step 206 comprises conducting the gaseous stream through a heated portion of a pipe. Cool conducting step 208 comprises conducting the gaseous stream through a cooled portion of a pipe. Optional second injection step (not shown) may comprise injecting a neutralizing agent into the gaseous stream at an injection point, wherein the injection point is located within the cooled portion of the pipe.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A residual impurity management method comprising:
    directing a gaseous stream through an unlined portion of a pipe under at least one of a vacuum and a partial vacuum, wherein the gaseous stream comprises gaseous sodium, wherein the gaseous stream is at a temperature between 1400° C. and 2200° C.;
    allowing the gaseous stream to cool to between 900° C. and below 1400° C.;
    injecting a neutralizing agent into the gaseous stream at an injection point, wherein the injection point is located at a point where a portion of the sodium is not in gaseous form and wherein the gaseous stream is at a temperature of between 900° C. and below 1400° C.;
    conducting the gaseous stream through a heated portion of the pipe; and
    conducting the gaseous stream through a cooled portion of the pipe.

2. The method of claim 1 wherein the gaseous stream further comprises a hydrocarbon.

3. The method of claim 2, further comprising condensing the hydrocarbon.

4. The method of claim 1, wherein the neutralizing agent is at least one of steam, water vapor, nitrous oxide, carbon dioxide, and air.

5. The method of claim 1, wherein the heated portion of a pipe comprises an inner chamber and an outer chamber, wherein the gaseous stream is in contained within the inner chamber and a heating fluid is circulated through the outer chamber.

6. The method of claim 1, wherein the cooled portion of a pipe comprises an inner chamber and an outer chamber, wherein the gaseous stream is contained within the inner chamber and a cooling fluid is circulated through the outer chamber.

7. The method of claim 1, wherein the heated portion of a pipe is at least partially lined.

8. The method of claim 1, further comprising injecting a secondary neutralizing agent through the cooled portion of the pipe.

9. The method of claim 8, wherein the secondary neutralizing agent is at least one of steam, water vapor, nitrous oxide, carbon dioxide, and air.

* * * * *